(12) United States Patent
Haefele

(10) Patent No.: US 9,849,927 B2
(45) Date of Patent: Dec. 26, 2017

(54) WIDTH-ADJUSTABLE MODULAR HEAVY GOODS VEHICLE, AND TRANSVERSE FRAME MODULE FOR A HEAVY GOODS VEHICLE OF SAID TYPE

(71) Applicant: GOLDHOFER AG, Memmingen (DE)

(72) Inventor: Horst Haefele, Babenhausen (DE)

(73) Assignee: GOLDHOFER AG, Memmingen (DE)

( * ) Notice: Subject to any disclaimer, the term of this patent is extended or adjusted under 35 U.S.C. 154(b) by 0 days.

(21) Appl. No.: 15/118,555

(22) PCT Filed: Feb. 11, 2015

(86) PCT No.: PCT/EP2015/052847
§ 371 (c)(1),
(2) Date: Aug. 12, 2016

(87) PCT Pub. No.: WO2015/121291
PCT Pub. Date: Aug. 20, 2015

(65) Prior Publication Data
US 2017/0050692 A1    Feb. 23, 2017

(30) Foreign Application Priority Data
Feb. 14, 2014   (DE) ........................ 10 2014 202 726

(51) Int. Cl.
*B62D 63/06*    (2006.01)
*B62D 21/14*    (2006.01)
(Continued)

(52) U.S. Cl.
CPC ........... *B62D 63/061* (2013.01); *B60D 1/481* (2013.01); *B62D 13/025* (2013.01); *B62D 21/14* (2013.01);
(Continued)

(58) Field of Classification Search
CPC .............................. B62D 21/14; B62D 63/068
See application file for complete search history.

(56) References Cited

U.S. PATENT DOCUMENTS 3,698,734 A   10/1972   Drake
3,712,398 A   1/1973   Althaus
(Continued)

FOREIGN PATENT DOCUMENTS

AU   2009 200 341   8/2010
DE   84 22 387   5/1986
(Continued)

OTHER PUBLICATIONS

German Search Report conducted in counterpart German Appln. No. 10 2014 202 726.8 (dated Sep. 30, 2014).

*Primary Examiner* — Kevin Hurley
(74) *Attorney, Agent, or Firm* — Greenblum & Bernstein, P.L.C.

(57) ABSTRACT

A modular heavy goods vehicle (10) comprises a left vehicle module (12) and a differently designed right vehicle module (14), each of which includes a longitudinal frame part (20, 24) and at least two wheel subassemblies (22, 26), and two transverse frame modules (16, 18) which extend in the direction of the width (B) of the vehicle and the free ends of which are releasably connected to the longitudinal frame parts (20, 24), the length of the transverse frame modules being adjustable.

17 Claims, 9 Drawing Sheets

(51) Int. Cl.
  *B62D 63/02* (2006.01)
  *B60D 1/48* (2006.01)
  *B62D 13/02* (2006.01)
  *B60P 1/02* (2006.01)

(52) U.S. Cl.
  CPC ......... *B62D 63/025* (2013.01); *B62D 63/068* (2013.01); *B60P 1/027* (2013.01)

(56) References Cited

U.S. PATENT DOCUMENTS

| | | | | |
|---|---|---|---|---|
| 4,221,398 | A * | 9/1980 | Pautrat | B60P 3/064 |
| | | | | 280/444 |
| 6,145,610 | A | 11/2000 | Gallignani | |
| 6,206,126 | B1 | 3/2001 | Thiermann et al. | |
| 6,851,494 | B2 | 2/2005 | Harthauser | |
| 9,522,707 | B2 * | 12/2016 | Kern | B60G 7/02 |
| 2003/0136592 | A1 | 7/2003 | Harthauser | |

FOREIGN PATENT DOCUMENTS

| | | | | |
|---|---|---|---|---|
| DE | 102 00 175 | | 7/2003 | |
| DE | 20 2012 011 898 | | 3/2013 | |
| DE | WO 2014090407 A1 * | | 6/2014 | ............... B60G 7/02 |
| FR | 2 399 351 | | 3/1979 | |
| WO | 00/64700 | | 11/2000 | |
| WO | 2010/094935 | | 8/2010 | |

* cited by examiner

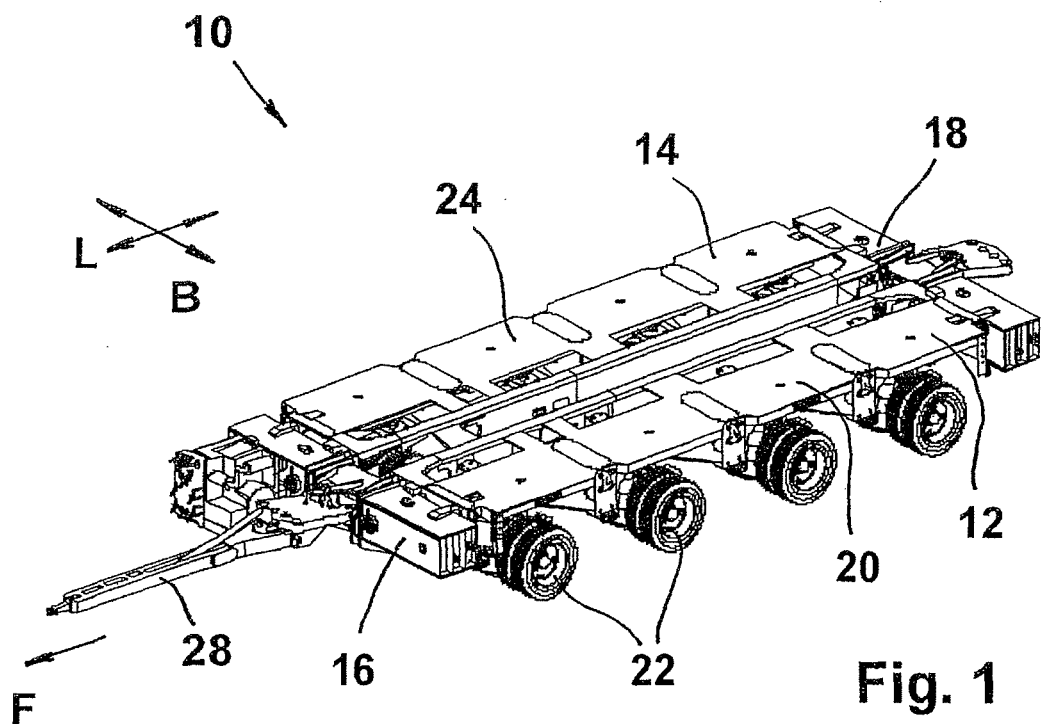
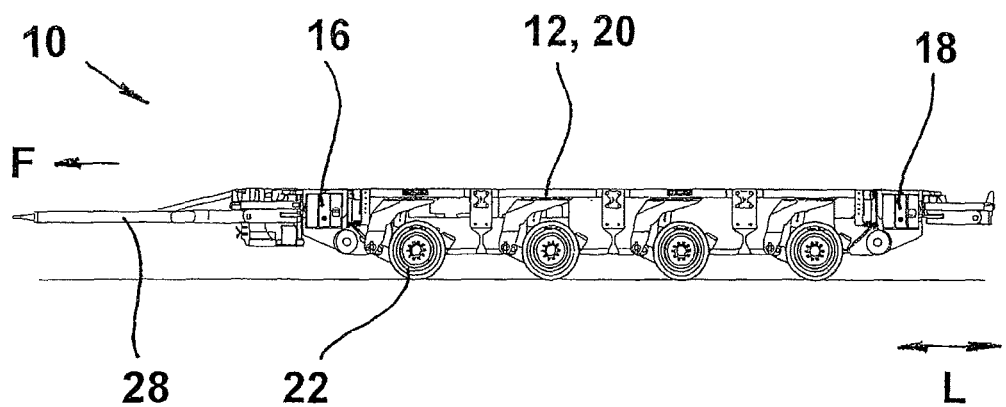

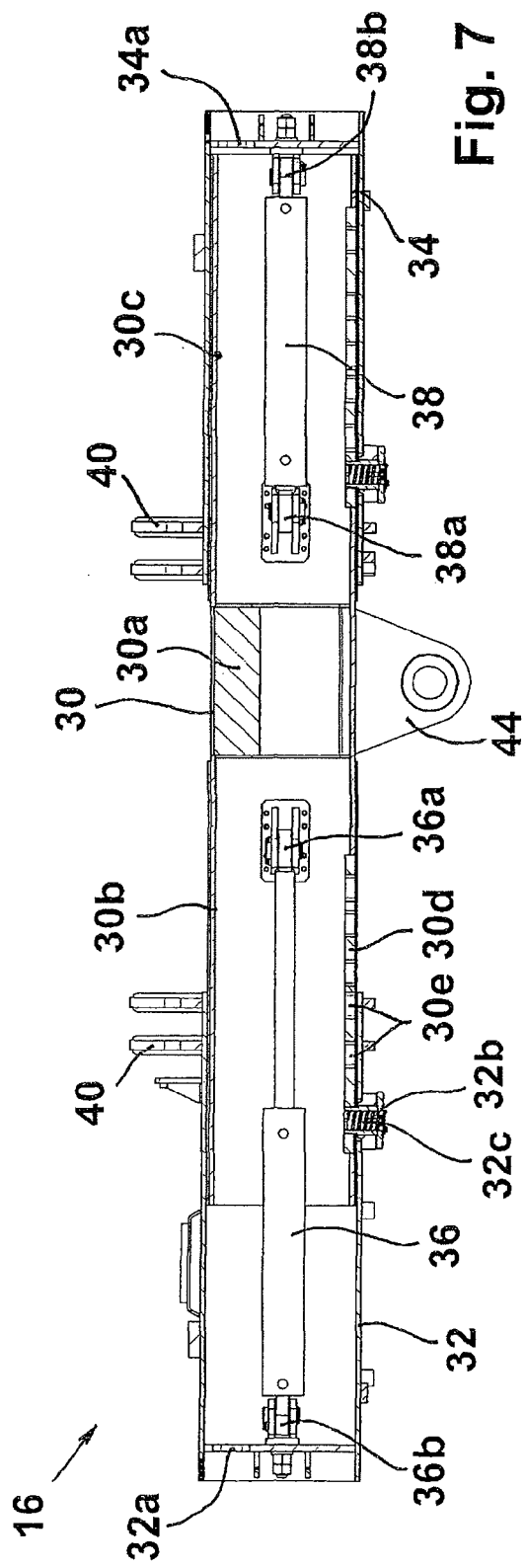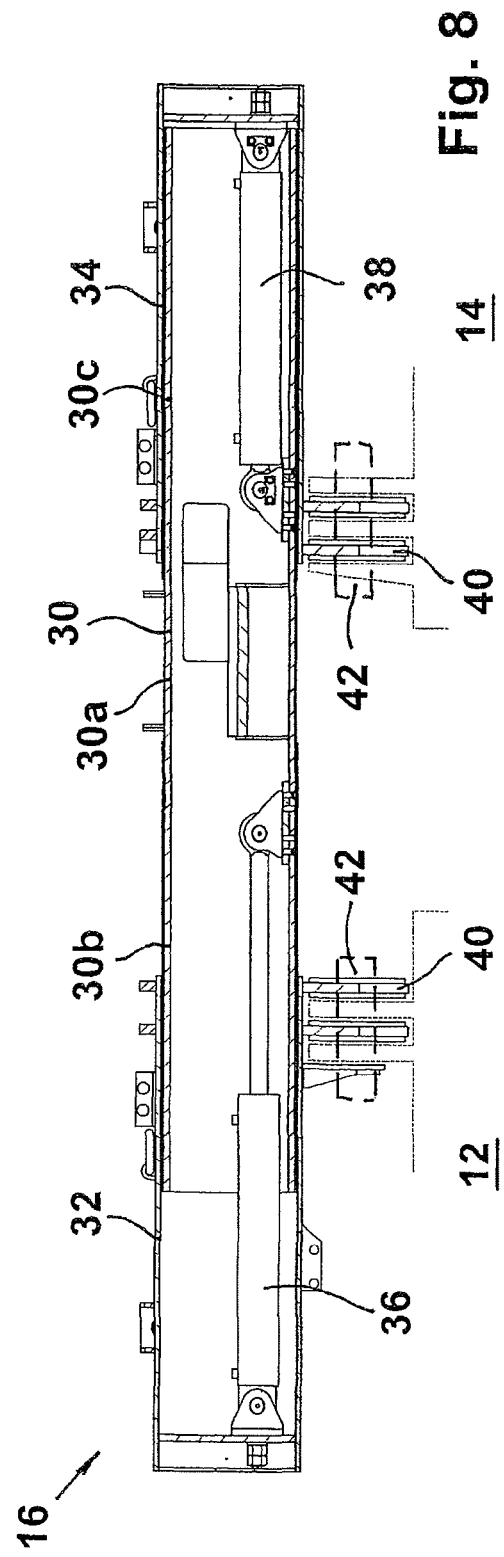

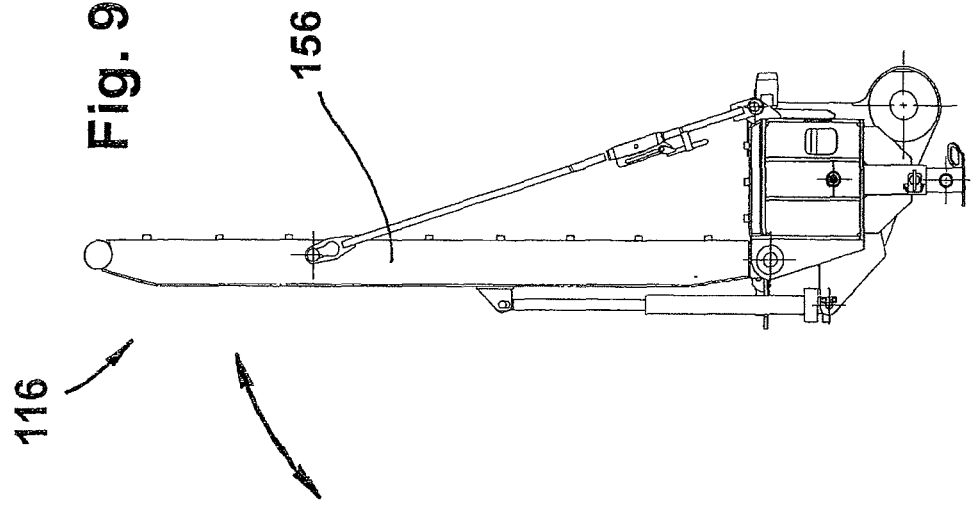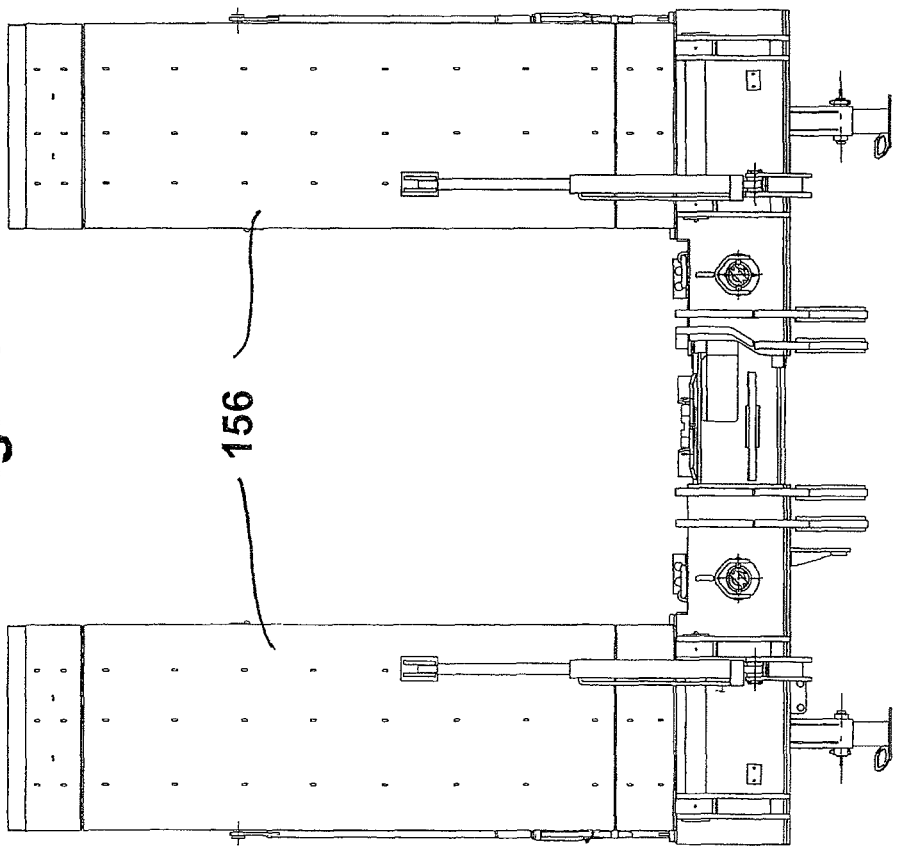

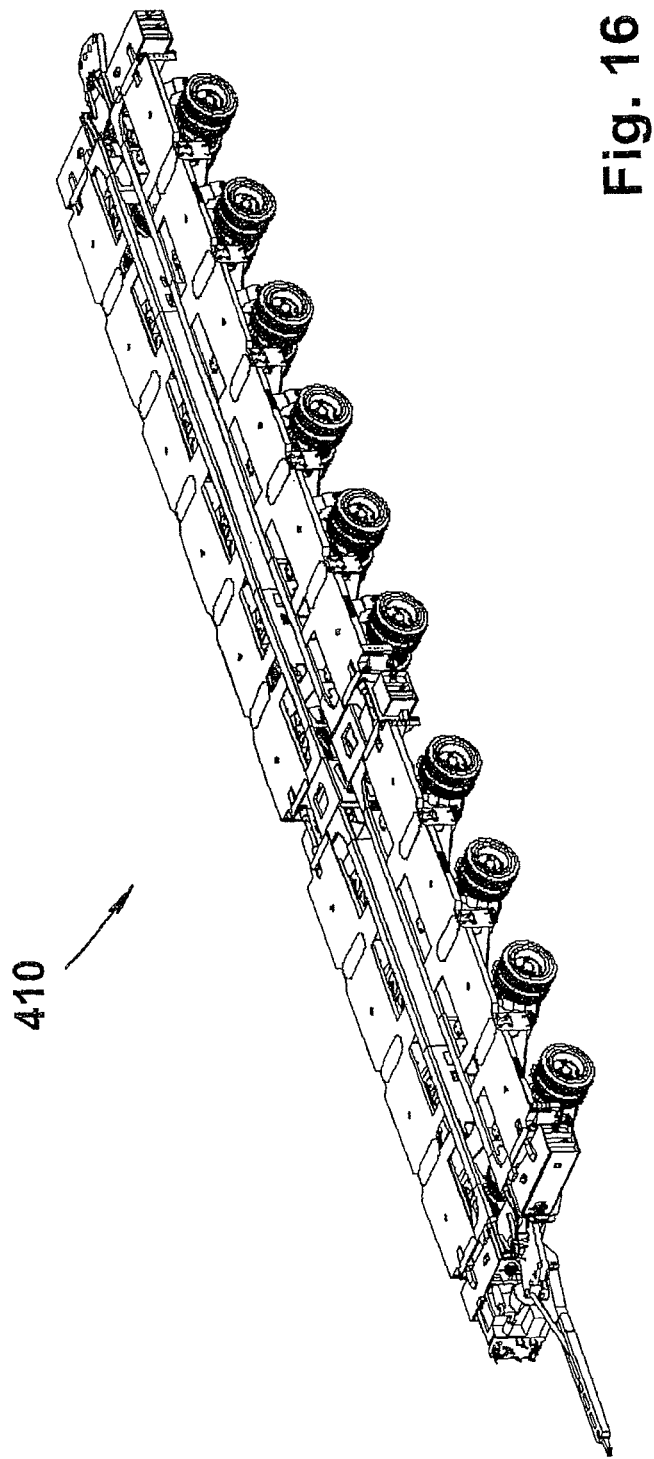

WIDTH-ADJUSTABLE MODULAR HEAVY GOODS VEHICLE, AND TRANSVERSE FRAME MODULE FOR A HEAVY GOODS VEHICLE OF SAID TYPE

CROSS-REFERENCE TO RELATED APPLICATIONS

The present application is a U.S. National Stage of International Patent Application No. PCT/EP2015/052847 filed Feb. 11, 2015, and claims priority under 35 U.S.C. §119(a) and 365 of German Patent Application No. 10 2014 202 726.8 filed Feb. 14, 2014. Moreover, the disclosure of International Patent Application No. PCT/EP2015/052847 is expressly incorporated by reference herein in its entirety.

BACKGROUND OF THE INVENTION

1. Field of the Invention

The invention relates to a modular heavy goods vehicle comprising a left-hand vehicle module having a left-hand longitudinal frame part that extends in the vehicle length direction and to which at least two left-hand wheel assemblies are attached one behind the other when viewed in the vehicle length direction, a right-hand vehicle module that is formed separately from said left-hand module and has a right-hand longitudinal frame part that extends in the vehicle length direction and to which at least two right-hand wheel assemblies are attached one behind the other when viewed in the vehicle length direction, and two connection units that extend in the vehicle width direction, one free end of which units is connected to the left-hand longitudinal frame part and the other free end of which is connected to the right-hand longitudinal frame part.

It should be pointed out here that, in connection with the present invention, direction specifications such as "left-hand", "right-hand", "front", "rear" and the like both relate to a state in which the modular heavy goods vehicle is ready to start and assume a viewing direction that coincides with the forward travel direction of the modular heavy goods vehicle. This ready-to-start state and this viewing direction also form the basis for the description of the individual modules from which the modular heavy goods vehicle is assembled.

2. Discussion of Background Information

The applicant has successfully distributed modular heavy goods vehicles and modules for modular heavy goods vehicles of this kind for many years. The basic principle of the modular construction consists in a kit of modules that can be combined with one another being made available to the haulage companies, from which modules a vehicle suitable for transporting the load in question can be assembled for each haulage job.

In particular in view of the specific licensing and operating requirements in the USA and in Australia, the applicant has in this case also developed the generic modular heavy goods vehicles that comprise a vehicle frame that is split in the longitudinal centre plane of the vehicle such that not only can the desired vehicle length be obtained by arranging a plurality of vehicle modules one behind the other, but the desired vehicle width can also be obtained by arranging connection units between the left-hand and right-hand vehicle modules, which units extend in the vehicle width direction. In this way, it is possible to achieve vehicle widths of up to 6100 mm (20 feet) for example.

It can be clearly seen that the operation of heavy goods vehicles of this kind is subject to specific requirements, since said vehicles occupy more than one carriageway on account of their large vehicle width. However, making the operation safe by way of escort or even police vehicles results in high costs which, although unavoidable when transporting the load to the destination, are not acceptable for the return journey in the unladen state. In this respect, the applicant's generic modular heavy goods vehicles offer the vehicle operator the possibility of dismantling the vehicles at the destination after the load has been unloaded, and in particular removing the connection units that extend in the vehicle width direction, with the result that the left-hand and right-hand vehicle modules can be directly fixed to one another. However, this adaptation of course also requires work time and therefore results in costs.

SUMMARY OF THE EMBODIMENTS

The present invention is therefore that of specifying a modular heavy goods vehicle of the type mentioned at the outset, the vehicle width of which can be altered in a quick and therefore cost-effective manner.

The present invention is directed to a modular heavy goods vehicle of the type mentioned at the outset, in which the two connection units are designed as length-alterable cross-frame modules that are formed separately from both the left-hand longitudinal frame part and the right-hand longitudinal frame part, wherein a first of said cross-frame modules is releasably attachable to one longitudinal end of the two longitudinal frame parts and the other of said cross-frame modules is releasably attachable to the other longitudinal end of the two longitudinal frame parts, preferably the end face thereof.

According to the invention, the length-alterable cross-frame modules (connection units) according to the invention form further "units" of the modular kit that can be made available to the haulage companies.

In connection with the present invention, the term "cross-frame module" is used in the sense that each cross-frame module contains all the functional elements that are required for providing the length-alterability, and therefore the left-hand and right-hand vehicle modules comprising the left-hand and right-hand longitudinal frame parts thereof that extend in the vehicle length direction are designed so as to be free of functional elements that are required for providing the length-alterability. The cross-frame modules can thus be combined with left-hand and right-hand vehicle modules of any design, in particular modules which haulage companies already own, provided that said cross-frame modules can be connected to said modules only in an operationally stable manner, in order to ultimately obtain a width-adjustable modular heavy goods vehicle.

The subject matter of the present invention of course also includes modular heavy goods vehicles in which further modules are present in addition to the left-hand and right-hand vehicle modules comprising the left-hand and right-hand longitudinal frame parts thereof that extend in the vehicle length direction, and the two length-alterable cross-frame modules. For example, further left-hand and right-hand vehicle modules can be attached in the vehicle length direction, which modules are in turn terminated by a further length-alterable cross-frame module. Preferably, one length-adjustable cross-frame module should be provided approximately every 10 m.

In a development of the invention, it is proposed for at least one cross-frame module, preferably all the length-adjustable cross-frame modules, to comprise cross-frame parts that engage in one another in a telescopic manner and enclose a cavity, at least one power unit that causes the length-adjustment of the cross-frame module being arranged in the cavity. Thus, the cross-frame parts that engage in one another in a telescopic manner can take on the support function of the cross-frame module, while the length-alterability is provided by the at least one power unit. The power unit can be a hydraulically and/or pneumatically actuable power unit for example.

For example, the at least one cross-frame module can comprise a central cross-frame part having two side portions and two lateral cross-frame parts that surround the side portions of the central cross-frame part and are movable relative thereto. In addition, a middle portion can be provided between the two side portions of the central cross-frame part, which middle portion is preferably formed integrally with the two side portions. Whereas the two lateral frame parts can be used for attaching functional elements that are also adjusted in the width direction of the vehicle when the vehicle width is altered, the middle portion can be used for attaching functional elements that should not be adjusted in the width direction of the vehicle when the vehicle width is altered.

The functional elements that are also adjusted in the width direction of the vehicle when the vehicle width is altered can be, for example, coupling elements for coupling the cross-frame module to the left-hand and right-hand vehicle modules, and/or coupling elements for coupling the cross-frame module in the form of a link between a plurality of vehicle modules arranged one behind the other when assembling a modular heavy goods vehicle that comprises a plurality of left-hand and right-hand vehicle modules arranged one behind the other in the vehicle length direction, and/or folding loading ramps, for example for a vehicle that is to be transported on the modular heavy goods vehicle.

Moreover, the functional elements that should not be adjusted in the width direction of the vehicle when the vehicle width is altered can be, for example, coupling elements for coupling the cross-frame module to a vehicle module, of which the width is not adjustable, and/or coupling elements for attaching a drawbar assembly.

In this context, it is advantageous for at least one of the cross-frame modules to be releasably attachable to the end face of the longitudinal end of the two longitudinal frame parts assigned in each case. In this embodiment, the coupling elements which are in any case present on the left-hand and right-hand vehicle modules for the purpose of connection to further left-hand and right-hand vehicle modules can also be used for connecting the cross-frame modules to the left-hand and right-hand vehicle modules.

A first variant of a cross-frame module according to the invention can, for example, comprise coupling elements on the front side thereof for attaching a drawbar assembly, and coupling elements on the rear side thereof for coupling the cross-frame module to the left-hand and right-hand vehicle modules. A cross-frame module of this kind can be provided, for example, at the front end of the modular heavy goods vehicle in order to attach the drawbar. In addition, however, a cross-frame module of this kind can also be provided at the rear end of the modular heavy goods vehicle.

A second variant of a cross-frame module according to the invention can, for example, comprise coupling elements on the front side thereof for coupling the cross-frame module to the left-hand and right-hand vehicle modules, and folding loading ramps on the rear side thereof, for example for a vehicle that is to be transported on the modular heavy goods vehicle. A cross-frame module of this kind is preferably arranged at the rear end of the modular heavy goods vehicle.

A third variant of a cross-frame module according to the invention can, for example, comprise coupling elements on both the front side and the rear side thereof for coupling the cross-frame module to left-hand and right-hand vehicle modules. This type of cross-frame module is preferably used for assembling longer width-adjustable heavy goods vehicles from a plurality of right-hand and left-hand vehicle modules. In order to ensure the stability of the heavy goods vehicle, it is advantageous, as mentioned above, for a cross-frame module of this kind to be provided approximately every 10 m.

A fourth variant of a cross-frame module according to the invention can, for example, comprise coupling elements on the front side thereof for coupling the cross-frame module to the left-hand and right-hand vehicle modules, and can comprise coupling elements on the rear side thereof for coupling the cross-frame module to a vehicle module, of which the width is not adjustable.

Advantageously, a separate power unit can be allocated to each of the lateral cross-frame parts, one end of which power unit engages on the central cross-frame part and the other end of which engages on the respective lateral cross-frame part. This has the advantage that each of the power unit can be designed to be weaker and thus smaller and more cost-effective than is the case when the power required for the width adjustment has to be generated by a single power unit. In addition, this embodiment makes it possible to provide through-openings for functional elements to pass through, in particular for drag links to pass through, in the cross-frame module, for example in the middle portion of the central cross-frame part.

With respect to the support function, the at least one cross-frame module can have a rectangular or square profile in a cross section extending substantially orthogonally to the vehicle width direction, two of the side faces of the rectangular or square profile preferably extending substantially orthogonally to the vehicle length direction.

In order to be able to ensure the required width stability of the vehicle during driving, after the modular heavy goods vehicle has been set to the desired vehicle width, a development of the invention proposes that the frame elements that engage in one another in a telescopic manner, for example each of the lateral cross-frame parts and the respectively associated side portion of the central cross-frame part, are releasably interconnectable in an operationally stable manner. For example, the lateral cross-frame parts can comprise a through-hole for guiding through an engagement bolt, and the associated side portions of the central cross-frame part can comprise a plurality of engagement recesses into which the engagement bolt is insertable. The engagement bolt can for example be a bolt having a smooth surface, which bolt engages in smooth-walled engagement recesses and is preloaded, for example spring-preloaded, in this engagement position. Alternatively, however, the engagement bolt can also be a bolt provided with an external thread, and the engagement recesses can be designed having a corresponding mating thread.

In addition, it is advantageous for a display to be provided that displays the relative position of the lateral cross-frame part and of the associated side portion of the central cross-frame part. This display can, for example, comprise a window in the lateral cross-frame part in which a plurality of markings which are associated with the engagement recesses can be seen in each case.

For reasons of road safety, it is advantageous for both lateral cross-frame parts to assume the same relative position in relation to the respectively associated side portion of the central cross-frame part.

In order to be able to ensure proper activation of the drawbar-controlled steering apparatus of the heavy goods vehicle irrespective of the vehicle width set in each case, it is proposed for a steering angle forwarding element to be provided that is connected to an input drag link of the drawbar-controlled steering system, is pivotable relative to the drawbar and is releasably connectable to the drawbar in at least one relative pivot position.

Advantageously, the axis about which the steering angle forwarding element is pivotable relative to the drawbar is identical to the axis about which the drawbar is pivotable relative to the modular heavy goods vehicle. According to this development, the changes in the steering angle transmission when the drawbar and steering angle forwarding element are pivoted relatively can be controlled in a simple manner. In order to be able to adapt the steering angle transmission in a simple manner to the vehicle width selected in each case, the drawbar or an element connected thereto can comprise a through-hole for guiding through an engagement bolt, and the steering angle forwarding element can comprise a plurality of engagement recesses into which the engagement bolt is insertable and each of which corresponds to a predetermined vehicle width. In this case, too, the plurality of engagement recesses can be provided with markings, specifically preferably markings that correspond to those on the cross-frame modules, in order to make it easier for an operator to adjust the cross-frame modules and the drawbar steering to one another such that they match. It is therefore advantageous for there to be a fixed association between the engagement recesses of the steering angle forwarding element and those of the cross-frame module.

BRIEF DESCRIPTION OF THE DRAWINGS

The invention will be described in greater detail in the following via of embodiments on the basis of the accompanying drawings, in which:

FIG. 1 is a perspective view of a heavy goods vehicle according to the invention;

FIG. 2 is a side view of the heavy goods vehicle according to the invention from FIG. 1;

FIG. 7 is a section of the cross-frame module of FIG. 5 along the line VII-VII in FIG. 5;

FIG. 8 is a section of the cross-frame module of FIG. 5 along the line VIII-VIII in FIG. 5;

FIG. 9 is a side view of a second embodiment of a cross-frame module according to the invention;

FIG. 10 is a front view, i.e. a view in the vehicle length direction, of the cross-frame module of FIG. 9;

FIG. 16 is a second embodiment of a heavy goods vehicle according to the invention.

DETAILED DESCRIPTION OF THE EMBODIMENTS

Figure 3:
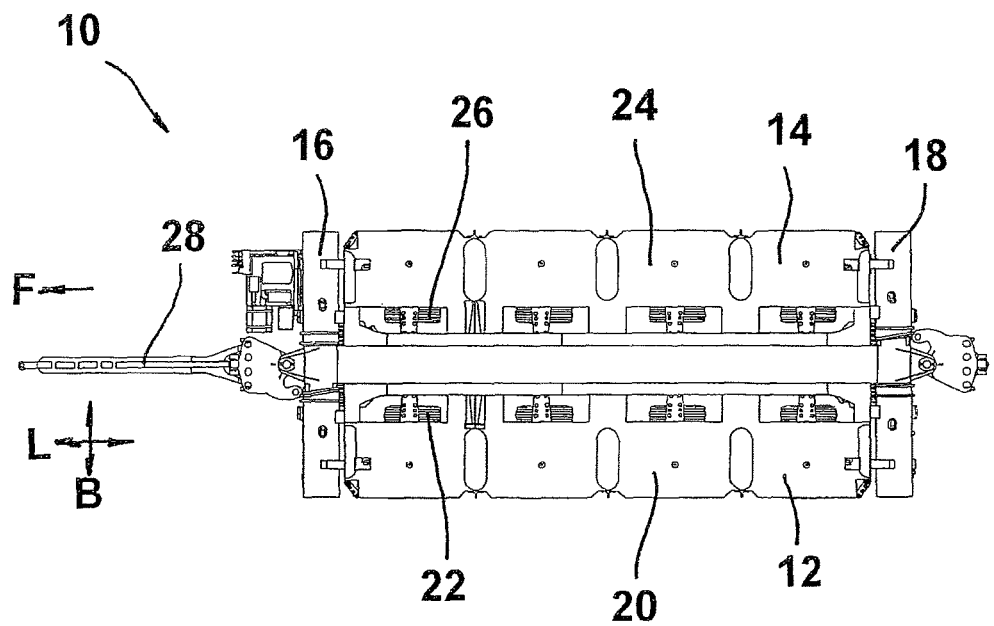
FIG. 3 is a plan view of the heavy goods vehicle according to the invention from FIG. 1, in the operating position thereof having the smallest width.

In FIG. 1, a modular heavy goods vehicle according to the invention is generally denoted by reference numeral 10. Viewed in the forward travel direction F, the heavy goods vehicle 10 comprises a left-hand vehicle module 12 and a right-hand vehicle module 14, a front cross-frame module (connection unit) 16, and a rear cross-frame module (connection unit) 18 which are, however, designed in an identical manner in the embodiment shown.

The left-hand vehicle module 12 comprises a left-hand longitudinal frame part 20 on which a plurality of left-hand wheel assemblies 22 arranged one behind the other in the longitudinal direction L of the heavy goods vehicle 10 are arranged. Similarly, the right-hand vehicle module 14 comprises a right-hand longitudinal frame part 24 on which a plurality of left-hand wheel assemblies 26 (see FIGS. 3 and 4) arranged one behind the other in the longitudinal direction L are arranged. The two cross-frame modules 16, 18 are arranged on the two longitudinal ends of the longitudinal frame parts 20 and 24, and are connected thereto in an operationally stable manner in order to form the modular heavy goods vehicle 10.

Figure 4:
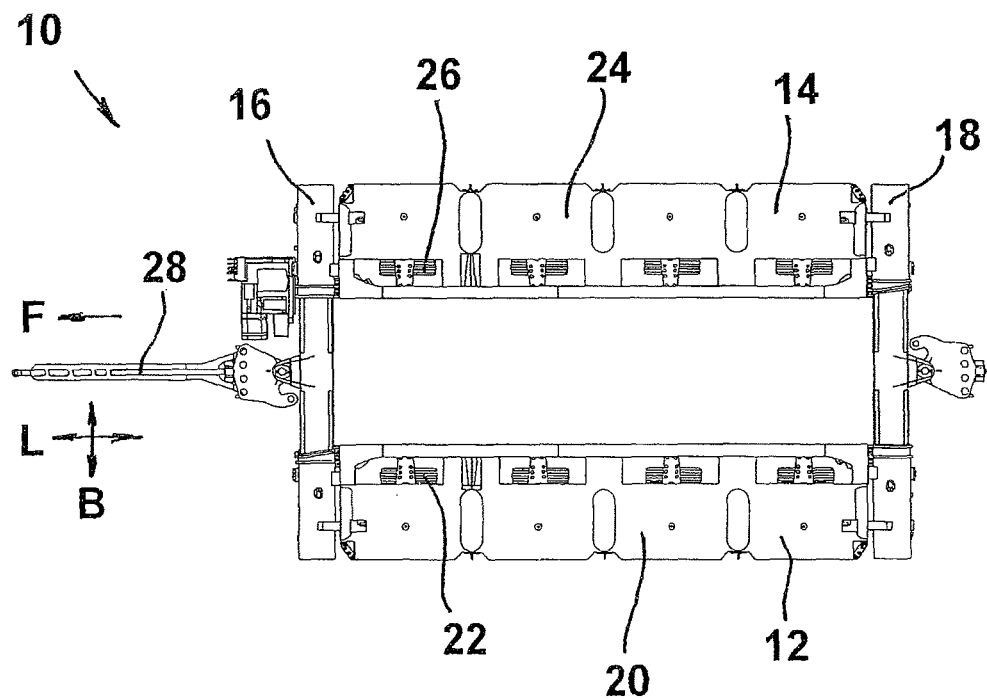
FIG. 4 is a plan view of the heavy goods vehicle according to the invention from FIG. 1, in the operating position thereof having the greatest width.

As can be seen from FIGS. 3 and 4, the cross-frame parts are designed to be length-alterable in the vehicle width direction indicated by the double-headed arrow B in order to be able to alter the width of the heavy goods vehicle 10. For example, the heavy goods vehicle 10 can be set to a large vehicle width, as shown in FIG. 4, for a haulage journey during which it is loaded with a load, while it can be set to a small width, as shown in FIG. 3, for a return journey without any load. The embodiment of the cross-frame modules 16 and 18 that permits this width adjustment will be described in detail in the following.

First, however, it should also be noted that the left-hand and right-hand vehicle modules 12 and 14 can be conventional vehicle modules, as have already been offered and distributed by the applicant for a long time as parts of a modular kit range. The left-hand and right-hand vehicle modules 12 and 14 virtually form units of this modular kit range, which range can also contain further types of units. For example, the modular kit range can also contain vehicle modules having, for example, two, three or six axles, loading bridges of various kinds, for example low profile decks, vessel decks or the like, and many other types of units, in addition to the four-axle vehicle modules 12, 14. A haulier who is tasked with transporting a specified load over a predetermined route can assemble, from all these units, a heavy goods vehicle that is matched to the transportation of the specified load over the predetermined route. The length-alterable cross-frame modules form new units of the modular kit range, and thus extend said range and increase the haulier's flexibility in terms of responding to the requirements of the haulage job in question.

It should be added, at this point, that the heavy goods vehicle 10 shown in FIGS. 1 to 4 is not a self-propelled vehicle, but rather a towed vehicle that can be connected to a towing vehicle (not shown) by a drawbar assembly 28. In principle, however, it is also conceivable for the wheel assemblies 22, 26 to be driven wheel assemblies that are driven by an electric motor and/or a hydraulic motor, with the result that the heavy goods vehicle 10, as a "self-propelling vehicle", can do without a drawbar-controlled steering apparatus 28.

FIGS. 5 to 14 show four variants of cross-frame modules as they can be used within the context of the present invention. All four variants have the same basic structure which will be described first, using the example of the first variant that is shown in more detail in FIGS. 5 to 8, specifically the example of the cross-frame modules 16, 18 used at the two longitudinal ends in the heavy goods vehicle 10 of FIGS. 1 to 4, before the specific additional features of the four variants are discussed.

The cross-frame module 16 comprises a central cross-frame part 30 having a middle portion 30a and two side portions 30b and 30c, and two lateral cross-frame parts 32, 34 that surround the side portions 30b and 30c, respectively, of the central cross-frame part 30 and are movable relative to said side portions 30b, 30c in order to permit the length of the cross-frame module 16 to be altered. The middle portion 30a is formed by that portion of the central cross-frame part 30 that is not covered by the lateral cross-frame parts 32, 34 when the lateral cross-frame parts 32, 34 are completely pushed onto the central middle portion 30.

Figure 5:
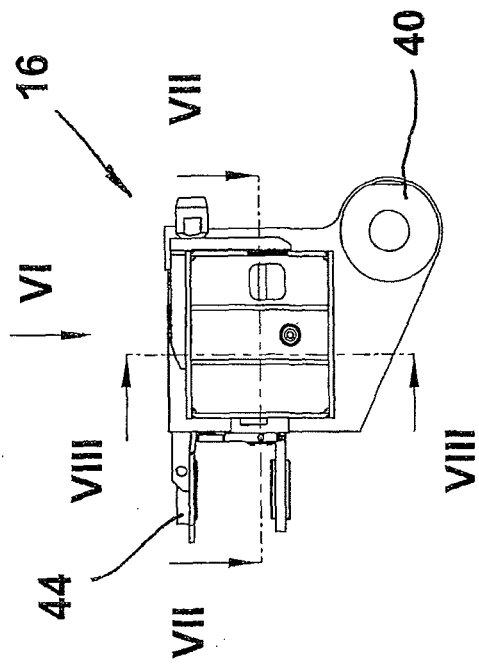
FIG. 5 is a side view of a first embodiment of a cross-frame module according to the invention.
Figure 6:
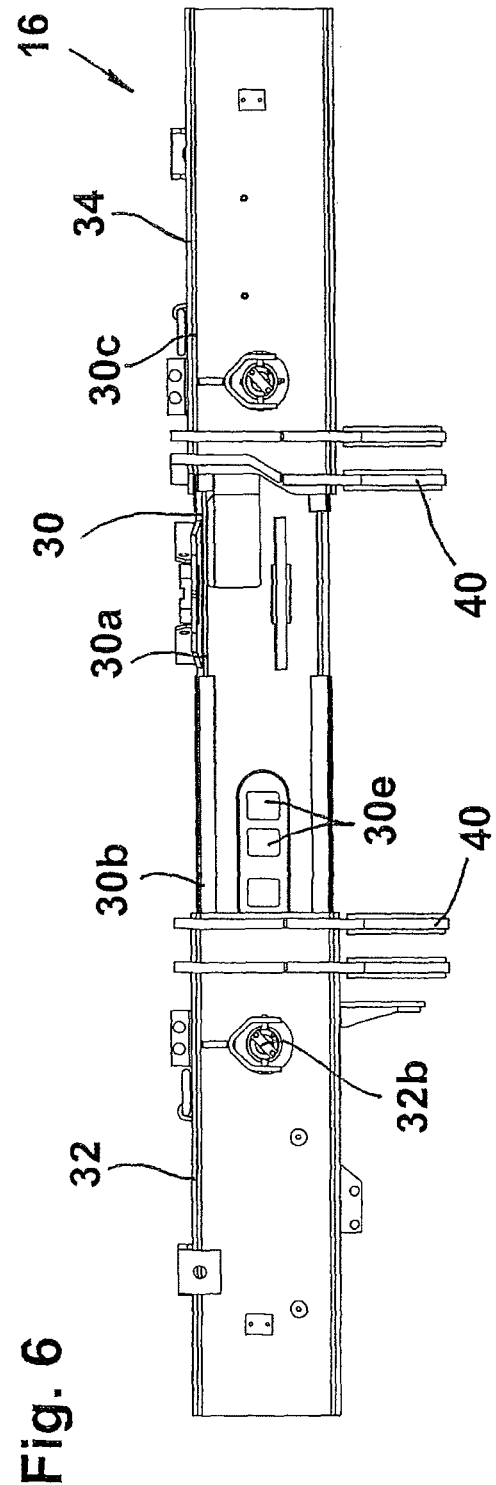
FIG. 6 is a front view, i.e. a view in the vehicle length direction, of the cross-frame module of FIG. 5.

As can be seen from FIG. 5 for example, the central cross-frame part 30 and the lateral cross-frame parts 32, 34 are each formed as hollow profile elements having a rectangular or square profile cross section. This results in a robust structure of the cross-frame module, with the result that the heavy goods vehicle 10 has the stability that is required for heavy goods haulage. Two power unit 36 and 38 are arranged in the cavity enclosed by the cross-frame parts 30, 32, 34, each of which is associated with one of the lateral cross-frame parts 32, 34. The right-hand end 36a (in FIGS. 7 and 8) of the left-hand power unit 36 is fastened to the central cross-frame part 30, while the left-hand end 36b of said power unit is fastened to a terminating wall 32a of the left-hand lateral cross-frame part 32. Similarly, the left-hand end 38a of the right-hand power unit 38 is fastened to the central cross-frame part 30, while the right-hand end 36b of said power unit is fastened to a terminating wall 34a of the right-hand lateral cross-frame part 34. This separation of the support function on the one hand, and the length-adjustability on the other hand, means firstly that standard parts can be used, which reduces production costs, and secondly that no compromises need to be made in terms of design that could adversely affect the functional capacity of the cross-frame module.

A thickness-reinforced portion 30b is provided in a vertical side wall of the side portion 30b of the central cross-frame part 30, in which thickness-reinforced portion a plurality of through-holes 30e are formed. A bolt 32b engages in one of these through-holes 30e, which bolt is retained on the associated lateral cross-frame part 32 and is preloaded in engagement with the through-hole 30e by a spring 32c. In order to adjust the length of the cross-frame module 16, the engagement of the bolt 32b in the hole 30e first has to be released. Subsequently, the length is altered using the power unit 36. Finally, the bolt 32b is in the hole 30e corresponding to the new length setting. The cross-frame module 16 can thus be locked in the new length setting, with the result that there is no risk of an undesired alteration to the vehicle width during driving and a precise width arrangement is achieved, to which the steering system can be set in a precisely matched manner.

As can be seen from FIG. 7, an identically designed locking apparatus is also assigned to the right-hand side portion 30c of the central cross-frame part 30 and to the right-hand lateral cross-frame part 34 associated therewith.

Finally, all the variants of cross-frame modules comprise coupling elements 40 at least on one of the sides thereof, i.e. on the front or rear side thereof when viewed in the travel direction F, such as are also provided on the longitudinal ends of conventional vehicle modules 12, 14, in order to be able to connect said modules to other vehicle modules to form a longer overall vehicle. In order to couple the cross-frame module 16 to the vehicle modules 12 and 14, the left-hand coupling elements 40 in FIG. 8 and the correspondingly formed mating coupling elements (indicated by dashed lines in FIG. 8) of the left-hand vehicle module 12 are guided into one another, and the right-hand coupling elements 40 in FIG. 8 and the correspondingly formed mating coupling elements (indicated by dashed lines in FIG. 8) of the right-hand vehicle module 14 are guided into one another. This engagement is then secured by securing bolts 42 (also indicated by dashed lines). Since, as can be seen from FIG. 5, the coupling elements 40 are arranged on the underside of the cross-frame module 16 and the securing bolt 42 has a round cross section, the cross-frame module 16 is also screwed to the vehicle modules 12 and 14 adjacently to the top edge of the cross-frame module 16 in order to prevent the cross-frame module 16 from tilting downwards. However, the coupling elements 40, the mating coupling elements thereof and the securing bolts 42 are almost entirely responsible for the stability of the heavy goods vehicle 10 and the transmission of tractive and thrust forces while the load is being transported.

Figure 15:
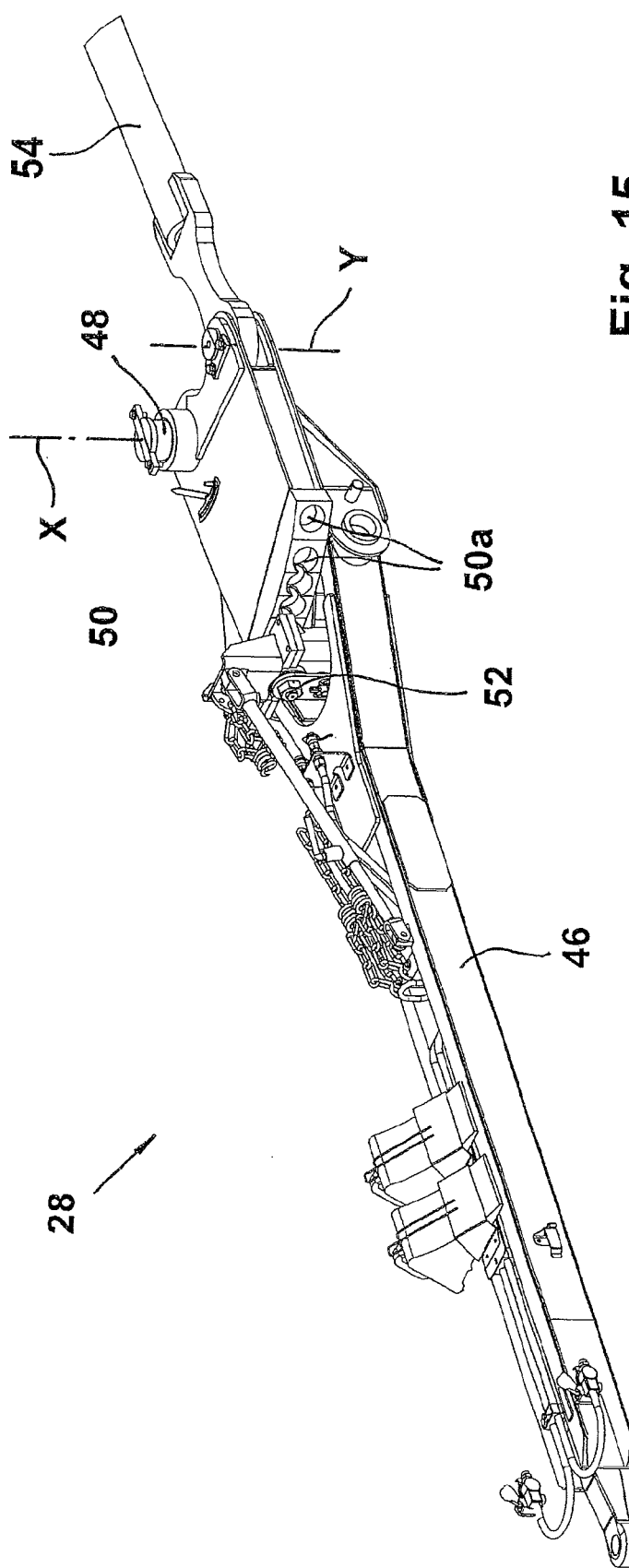
FIG. 15 is a perspective view of a drawbar assembly as it can be mounted according to FIGS. 1 to 4 on the first embodiment of a cross-frame module according to the invention according to FIGS. 5 to 8.

In the first variant shown in FIGS. 5 to 8, the cross-frame module 16 comprises, in addition to the basic structure described thus far, further coupling elements 44 on the front side thereof, which coupling elements are used for connecting to a drawbar assembly 28, as shown in FIG. 15.

The drawbar assembly 28 comprises a drawbar 46 that is attached to the cross-frame module 16 by a kingpin 48 that also passes through the openings in the coupling elements 44 of the cross-frame module 16, so as to be pivotable about a substantially vertically extending axis X. The tractive forces occurring during haulage are introduced into the heavy goods vehicle 10 via the drawbar 46 and the kingpin 48.

A steering angle forwarding element 50 that is also mounted so as to be pivotable about the axis X is arranged above the drawbar 46, the steering angle forwarding element 50 also being pivotable relative to the drawbar 46. However, different relative pivot positions of the drawbar 46 and the steering angle forwarding element 50 can be set in a fixed manner by a bolt 52 arranged on the drawbar 46 and which engages in one of a plurality of recesses 50a of the steering angle forwarding element 50. This makes it possible to match the steering angle forwarding from the drawbar 46 to the drag link 54 that leads to the steering apparatus of the heavy goods vehicle 10, is mounted on the steering angle forwarding element 50 so as to be pivotable about an axis Y spaced apart from the axis X and passes through a through-opening in the cross-frame module 16, to the vehicle width set in each case.

It is advantageous, for this purpose, for there to be a fixed association between the recesses 50a and the through-holes 30e and for this association to be identified to the operator by corresponding markings on the cross-frame module 16 and the steering angle forwarding element 50.

Instead of the cross-frame module 18 that, as mentioned above, is designed in an identical manner to the cross-frame module 16 but is arranged rotated by 180° on the rear end of the heavy goods vehicle 10, the cross-frame module 116 shown in FIGS. 9 and 10 can also be arranged on the rear end of the heavy goods vehicle 10. With regard to the length-adjustability in the vehicle width direction B and the attachment to the rear ends of the vehicle modules 12, 14, the structure of the cross-frame module 116 corresponds to that of the cross-frame module 16 of FIGS. 5 to 8. Therefore, the cross-frame module 116 will not be described further here in this respect. Rather, reference is made in this respect to the entire content of the description of the cross-frame module 16.

The cross-frame module 116 differs from the cross-frame module 16 merely in that loading ramps 156 for a vehicle to be transported on the heavy goods vehicle 10 are pivotally attached to the side on which, in the cross-frame module 16, the coupling elements 44 for attaching the drawbar assembly 28 are arranged.

Figure 11:
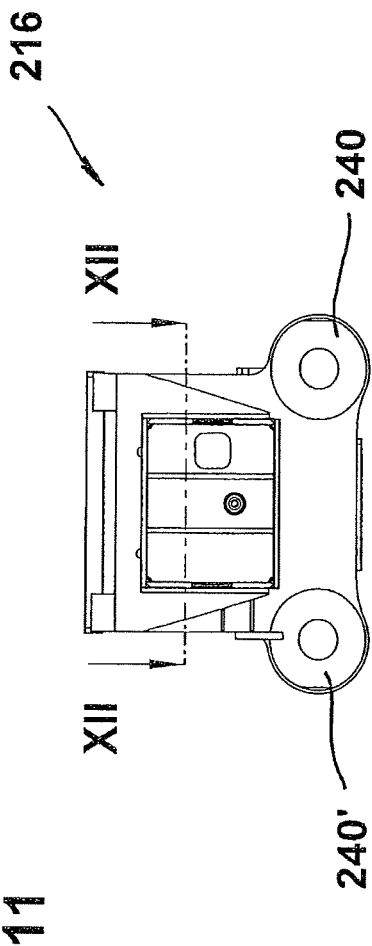
FIG. 11 is a side view of a third embodiment of a cross-frame module according to the invention.
Figure 12:
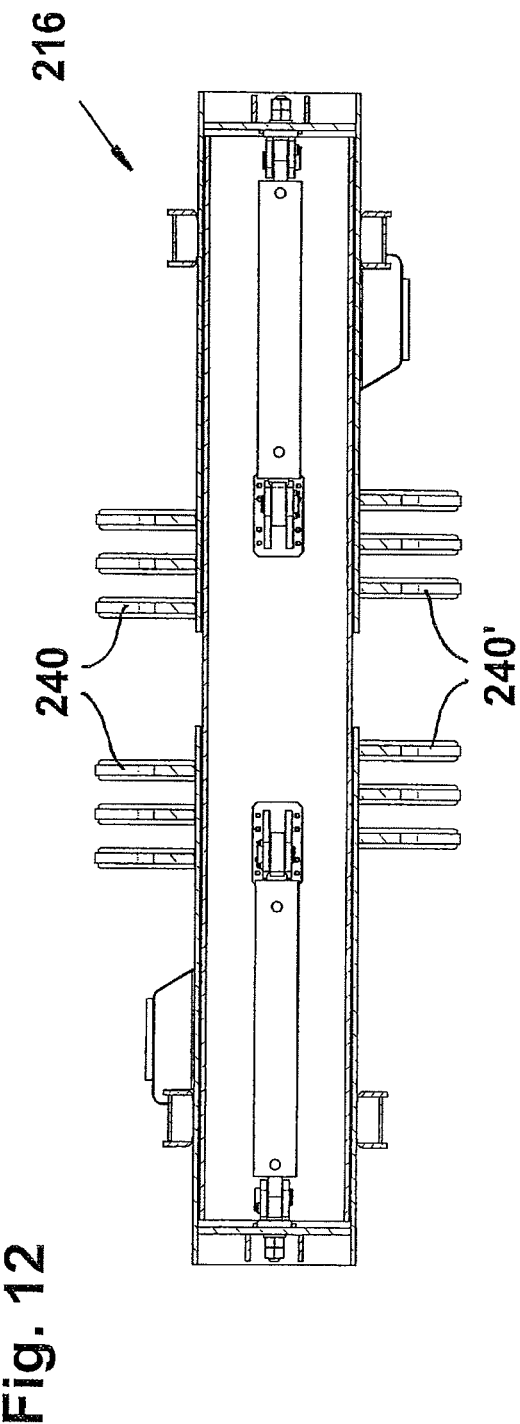
FIG. 12 is a section of the cross-frame module of FIG. 11 along the line XII-XII in FIG. 11.

Instead of the cross-frame module 16 (or, rotated by 180°: 18), the cross-frame module 216 shown in FIGS. 11 and 12 can also be arranged on the rear end of the heavy goods vehicle 10. With regard to the length-adjustability in the vehicle width direction B and the attachment to the rear ends of the vehicle modules 12, 14, the structure of the cross-frame module 216 corresponds to that of the cross-frame module 16 of FIGS. 5 to 8. Therefore, the cross-frame module 216 will not be described further here in this respect. Rather, reference is made in this respect to the entire content of the description of the cross-frame module 16.

The cross-frame module 216 differs from the cross-frame module 16 merely in that coupling elements 240' that are designed in an identical manner to the coupling elements 240 used for connection to the vehicle modules 12, 14 are arranged on the side on which, in the cross-frame module 16, the coupling elements 44 for attaching the drawbar assembly 28 are arranged. The cross-frame module 216 can thus be connected to vehicle modules both at the front side thereof and at the rear side thereof. Said cross-frame module is therefore suitable for use as an intermediate cross-frame module when it is desirable to assemble a longer width-adjustable heavy goods vehicle, for example the heavy goods vehicle 410 shown in FIG. 16.

Figure 13:
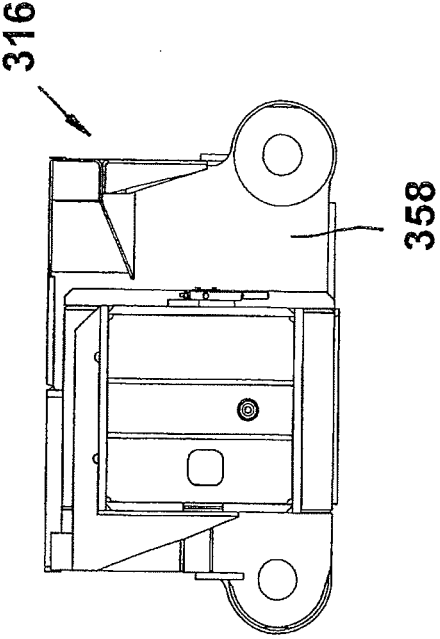
FIG. 13 is a side view of a fourth embodiment of a cross-frame module according to the invention.
Figure 14:
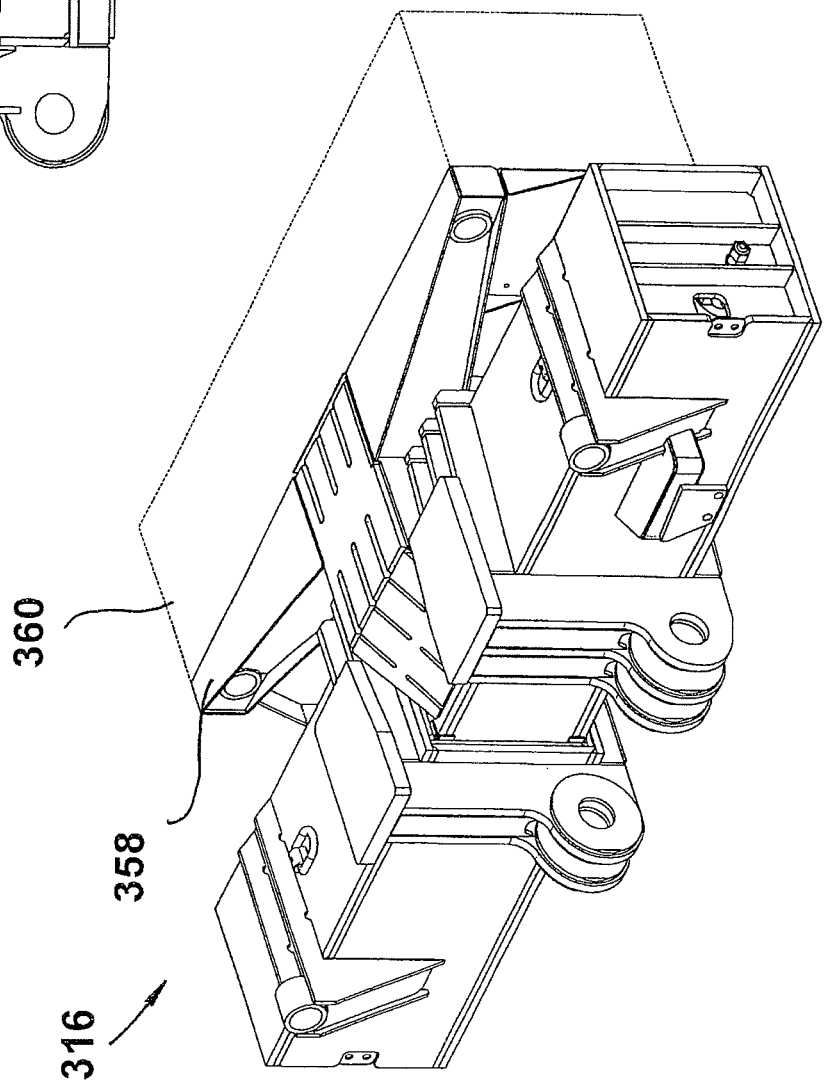
FIG. 14 is a perspective view of the cross-frame module of FIG. 13.

Instead of the cross-frame module 16 (or, rotated by 180°: 18), the cross-frame module 316 shown in FIGS. 13 and 14 can also be arranged on the rear end of the heavy goods vehicle 10. With regard to the length-adjustability in the vehicle width direction B and the attachment to the rear ends of the vehicle modules 12, 14, the structure of the cross-frame module 316 corresponds to that of the cross-frame module 16 of FIGS. 5 to 8. Therefore, the cross-frame module 316 will not be described further here in this respect. Rather, reference is made in this respect to the entire content of the description of the cross-frame module 16.

The cross-frame module 316 differs from the cross-frame module 16 merely in that a connection device 358 for fastening a module 360 that is not width-adjustable in the vehicle width direction B, for example a drive apparatus for the heavy goods vehicle 10 or 410, on the side on which, in the cross-frame module 16, the coupling elements 44 for attaching the drawbar assembly 28 are arranged.

The invention claimed is:

1. A modular heavy goods vehicle comprising:
a left-hand vehicle module having a left-hand longitudinal frame part that extends in a vehicle length direction (L);
at least two left-hand wheel assemblies attached one behind the other to the left-hand longitudinal frame part when viewed in the vehicle length direction (L),
a right-hand vehicle module, which is formed separately from said left-hand module, having a right-hand longitudinal frame part that extends in the vehicle length direction (L);
at least two right-hand wheel assemblies attached one behind the other to the right-hand longitudinal frame part when viewed in the vehicle length direction (L), and
two connection units extending in a vehicle width direction (B) as length-alterable cross-frame modules, in which each connection unit has a first end connected to the left-hand longitudinal frame part and a second end connected to the right-hand longitudinal frame part,
wherein the two connection units are formed separately from both the left-hand longitudinal frame part and the right-hand longitudinal frame part,
wherein a first of said cross-frame modules is releasably attachable to one longitudinal end of the left-hand and right-hand longitudinal frame parts and an other of said cross-frame modules is releasably attachable to an other longitudinal end of the left-hand and right-hand longitudinal frame parts, and
wherein the left-hand and right-hand vehicle modules are free of functional elements for providing the length-alterability in a cross-frame direction.

2. The modular heavy goods vehicle according to claim 1, wherein at least one cross-frame module is releasably attachable to an end face of the longitudinal end of the two longitudinal frame parts assigned in each case.

3. The modular heavy goods vehicle according to claim 1, wherein at least one cross-frame module has a rectangular or square profile in a cross section extending substantially orthogonally to the vehicle width direction (B).

4. The modular heavy goods vehicle according to claim 1, further comprising a steering angle forwarding element that is pivotable relative to a drawbar and is releasably connectable to the drawbar in at least one relative pivot position.

5. The modular heavy goods vehicle according to claim 4, wherein an axis (X) about which the steering angle forwarding element is pivotable relative to the drawbar is identical to the axis (X) about which the drawbar is pivotable relative to the modular heavy goods vehicle.

6. A cross-frame module for the heavy goods vehicle according to claim 1, comprising:
first and second ends structured and arranged to be connectable to respective ends of the left-hand longitudinal frame part and the right-hand longitudinal frame part;
and at least one of:
cross-frame telescoping parts that enclose a cavity; and
a central cross-frame part having two side portions and two lateral cross-frame parts that surround the side portions.

7. The cross-frame module according to claim 6, further comprising at least one power unit arranged in the cavity to drive a length-alteration of the cross-frame telescoping parts.

8. A modular heavy goods vehicle comprising:
a left-hand vehicle module having a left-hand longitudinal frame part that extends in a vehicle length direction (L);

at least two left-hand wheel assemblies attached one behind the other to the left-hand longitudinal frame part when viewed in the vehicle length direction (L), a right-hand vehicle module, which is formed separately from said left-hand module, having a right-hand longitudinal frame part that extends in the vehicle length direction (L);

at least two right-hand wheel assemblies attached one behind the other to the right-hand longitudinal frame part when viewed in the vehicle length direction (L), and two connection units extending in a vehicle width direction (B) as length-alterable cross-frame modules, in which each connection unit has a first end connected to the left-hand longitudinal frame part and a second end connected to the right-hand longitudinal frame part, wherein the two connection units are formed separately from both the left-hand longitudinal frame part and the right-hand longitudinal frame part, wherein a first of said cross-frame modules is releasably attachable to one longitudinal end of the left-hand and right-hand longitudinal frame parts and an other of said cross-frame modules is releasably attachable to an other longitudinal end of the left-hand and right-hand longitudinal frame parts, and at least one cross-frame module comprises cross-frame parts that engage in one another in a telescopic manner and enclose a cavity, at least one power unit that causes the length-alteration of the cross-frame module being arranged in the cavity.

9. The modular heavy goods vehicle according to claim 8, wherein a separate power unit is allocated to each of the lateral cross-frame parts, and wherein one end the power unit engages on the central cross-frame part and an other end of the power unit engages on a respective lateral cross-frame part.

10. A modular heavy goods vehicle comprising:
a left-hand vehicle module having a left-hand longitudinal frame part that extends in a vehicle length direction (L);
at least two left-hand wheel assemblies attached one behind the other to the left-hand longitudinal frame part when viewed in the vehicle length direction (L),
a right-hand vehicle module, which is formed separately from said left-hand module, having a right-hand longitudinal frame part that extends in the vehicle length direction (L);
at least two right-hand wheel assemblies attached one behind the other to the right-hand longitudinal frame part when viewed in the vehicle length direction (L), and
two connection units extending in a vehicle width direction (B) as length-alterable cross-frame modules, in which each connection unit has a first end connected to the left-hand longitudinal frame part and a second end connected to the right-hand longitudinal frame part,
wherein the two connection units are formed separately from both the left-hand longitudinal frame part and the right-hand longitudinal frame part,
wherein a first of said cross-frame modules is releasably attachable to one longitudinal end of the left-hand and right-hand longitudinal frame parts and an other of said cross-frame modules is releasably attachable to an other longitudinal end of the left-hand and right-hand longitudinal frame parts, and
wherein at least one cross-frame module comprises a central cross-frame part having two side portions and two lateral cross-frame parts that surround the side portions of the central cross-frame part and are movable relative thereto.

11. The modular heavy goods vehicle according to claim 10, further comprising a middle portion arranged between the two side portions of the central cross-frame part, wherein the middle portion is formed integrally with the two side portions.

12. The modular heavy goods vehicle according to claim 11, wherein at least one functional element, which is not adjustable in the width direction (B) of the vehicle when the vehicle width is altered, is attachable to the middle portion.

13. The modular heavy goods vehicle according to claim 12, wherein the at least one functional element that is not adjustable in the width direction (B) of the vehicle when the vehicle width is altered comprises at least one of:
at least one coupling element for coupling the cross-frame module that is not adjustable to a vehicle module, of which the width is not adjustable, and/or
at least one coupling element for attaching a drawbar assembly.

14. The modular heavy goods vehicle according to claim 10, further comprising at least one functional element attachable to the two lateral cross-frame parts, which is adjustable in the width direction (B) of the vehicle when the vehicle width is altered.

15. The modular heavy goods vehicle according to claim 14, wherein the at least one functional element adjustable in the width direction (B) of the vehicle when the vehicle width is altered comprises at least one of:
at least one coupling element for coupling the cross-frame module to the left-hand and right-hand vehicle modules, and/or
at least one coupling element for coupling the cross-frame module in the form of a link between a plurality of vehicle modules arranged one behind the other when assembling a modular heavy goods vehicle that comprises a plurality of left-hand and right-hand vehicle modules arranged one behind the other in the vehicle length direction (L), and/or
at least one folding loading ramp.

16. The modular heavy goods vehicle according to claim 10, wherein the lateral cross-frame parts and the respectively associated side portion of the central cross-frame part are releasably interconnectable in a rigid manner.

17. The modular heavy goods vehicle according to claim 10, further comprising a display from which the relative position of the lateral cross-frame part and of the associated side portion of the central cross-frame part is visible.

* * * * *